United States Patent [19]

Grammas et al.

[11] Patent Number: 4,772,869
[45] Date of Patent: Sep. 20, 1988

[54] COMMUNICATION APPARATUS

[75] Inventors: Nick G. Grammas, Plymouth; Michael T. Callas, Edina, both of Minn.

[73] Assignee: Lamba Systems, Inc., Irving, Tex.

[21] Appl. No.: 147,023

[22] Filed: Jan. 19, 1988

Related U.S. Application Data

[63] Continuation of Ser. No. 18,862, Feb. 24, 1987, abandoned, which is a continuation of Ser. No. 530,970, Sep. 12, 1983, abandoned.

[51] Int. Cl.[4] .............................................. G02B 5/12
[52] U.S. Cl. ........................... 340/114 B; 340/114 R; 340/815.01; 116/63 C; 40/612
[58] Field of Search ................... 340/815.01, 815.15, 340/815.16, 815.17, 815.18, 114 R, 114 B, 119; 116/63 R, 63 P, 63 C; 339/188 R, 188 C; 40/612

[56] References Cited

U.S. PATENT DOCUMENTS

| | | |
|---|---|---|
| D. 60,293 | 1/1922 | Meden . |
| D. 235,744 | 7/1975 | England . |
| D. 272,809 | 2/1984 | Bent et al. . |
| D. 277,738 | 2/1985 | Grammas et al. . |
| D. 277,739 | 2/1985 | Grammas et al. . |
| 362,108 | 5/1987 | Perkins ............................ 339/188 C |
| 2,002,756 | 5/1935 | Segelhorst ....................... 340/114 B |
| 2,340,530 | 2/1944 | Hefner ........................ 340/815.18 X |
| 2,456,685 | 12/1948 | Delmotte .................... 340/815.18 X |
| 2,806,131 | 9/1957 | Palmer ............................. 116/63 P |
| 2,949,531 | 8/1960 | Lemelson ......................... 340/114 B |
| 2,957,444 | 10/1960 | Boettler . |
| 3,080,553 | 3/1963 | Raynor ........................... 340/815.16 |
| 3,099,244 | 7/1963 | Knapp . |
| 3,119,588 | 1/1964 | Keats ................................. 116/63 P |
| 3,451,368 | 6/1969 | Keats . |
| 3,458,849 | 7/1969 | Marks et al. ..................... 339/188 C |
| 3,499,413 | 3/1970 | Heard . |
| 3,520,235 | 7/1970 | Palazzolo et al. . |
| 3,707,320 | 12/1972 | Brynes . |
| 3,732,842 | 5/1973 | Vara, Sr. ......................... 340/114 B |
| 3,809,007 | 5/1974 | Brown . |
| 3,825,354 | 7/1974 | Messner et al. ............. 340/114 B X |
| 4,083,033 | 4/1978 | Kulp et al. . |
| 4,197,808 | 4/1980 | Kinninger . |
| 4,329,800 | 5/1982 | Shuman . |
| 4,466,376 | 8/1984 | Wells ............................ 116/63 C X |
| 4,563,668 | 1/1986 | Martino ........................... 340/114 B |

FOREIGN PATENT DOCUMENTS

| | | |
|---|---|---|
| 1266412 | 2/1961 | France ................................. 116/63 |
| 1058881 | 2/1967 | United Kingdom . |
| 1301084 | 12/1972 | United Kingdom ............ 340/114 R |
| 1573851 | 8/1980 | United Kingdom ................. 40/612 |
| 2081348 | 2/1982 | United Kingdom .............. 116/63 C |
| 2090313 | 7/1982 | United Kingdom .............. 116/63 C |
| 2090625 | 7/1982 | United Kingdom .............. 116/63 C |

Primary Examiner—Gerald L. Brigance
Attorney, Agent, or Firm—Burd, Bartz & Gutenkauf

[57] ABSTRACT

A portable information marker having a tetrahedron stand joined to a base supported on a surface. The stand has a top wall releasably accommodating an information unit. The information unit and top wall have interlocking slot and ear structures allowing the information unit to be removed from the top wall and replaced with an alternate information unit. The alternate information unit can be a flashing light unit.

20 Claims, 5 Drawing Sheets

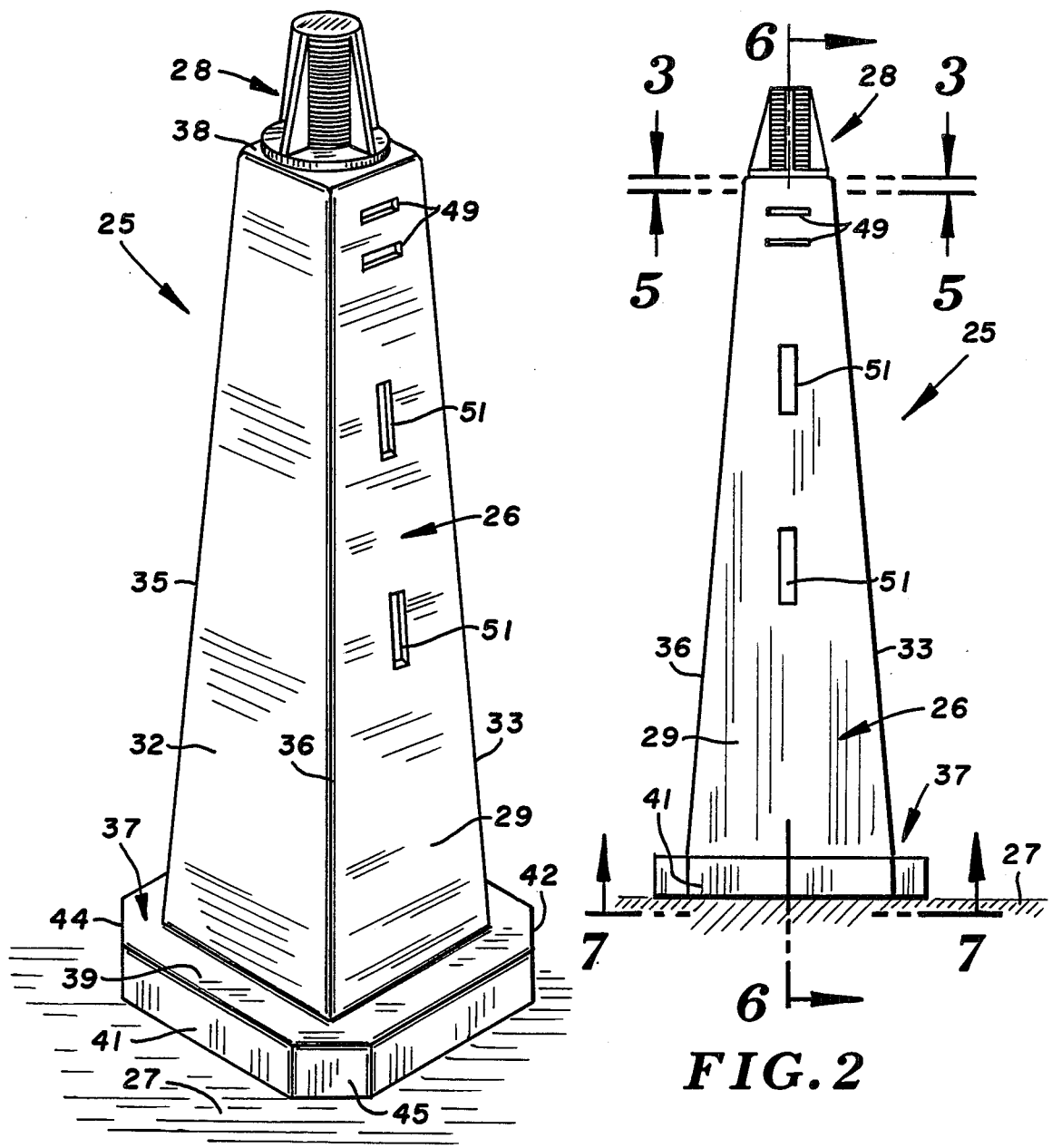
FIG.1
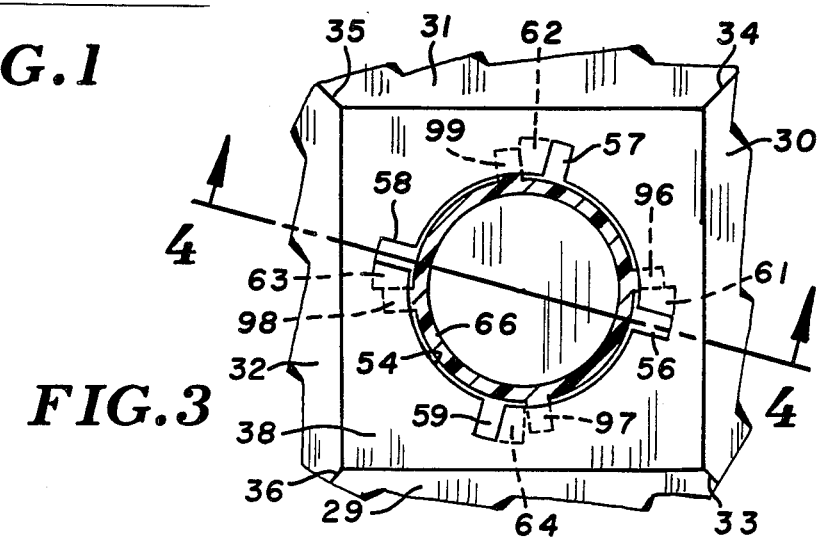
FIG.2
FIG.3

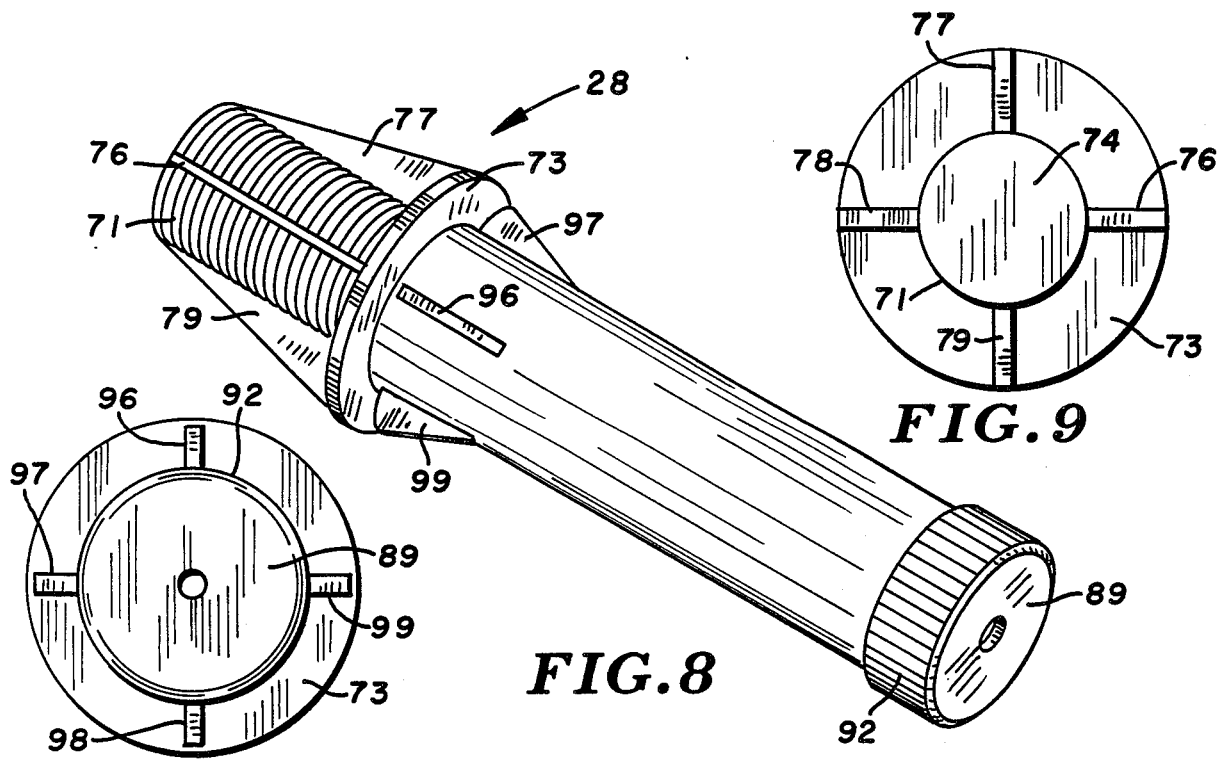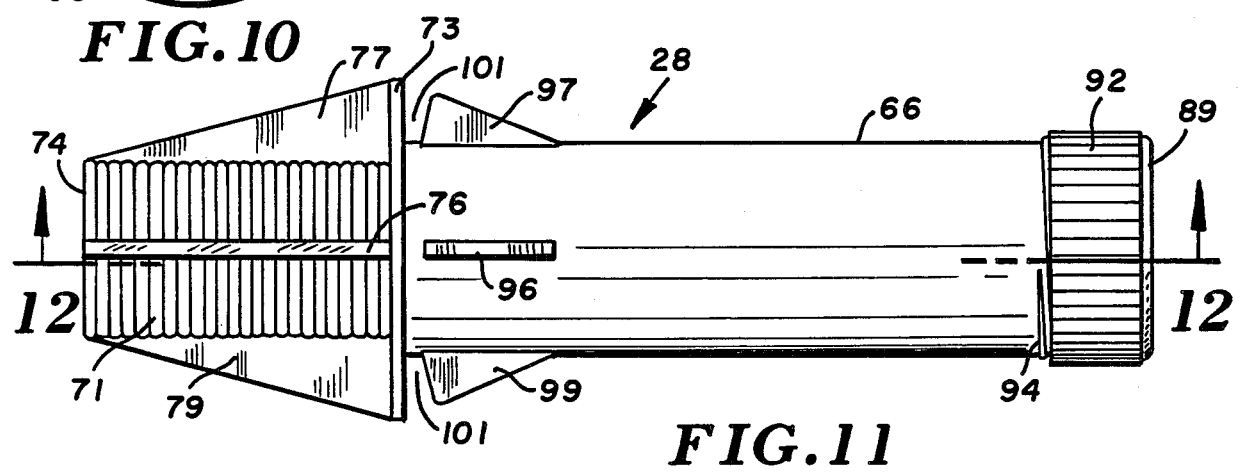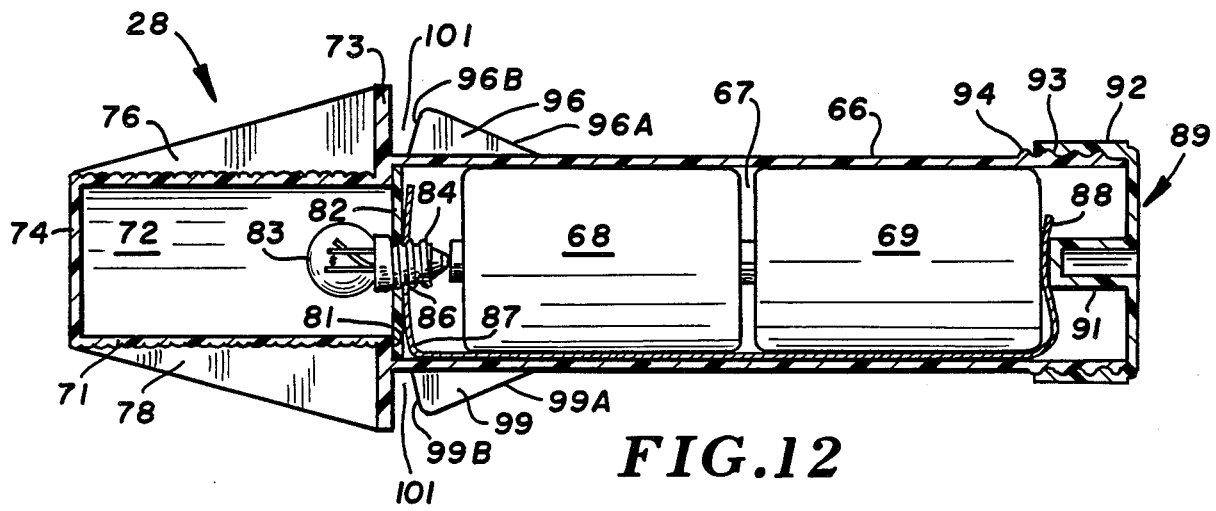

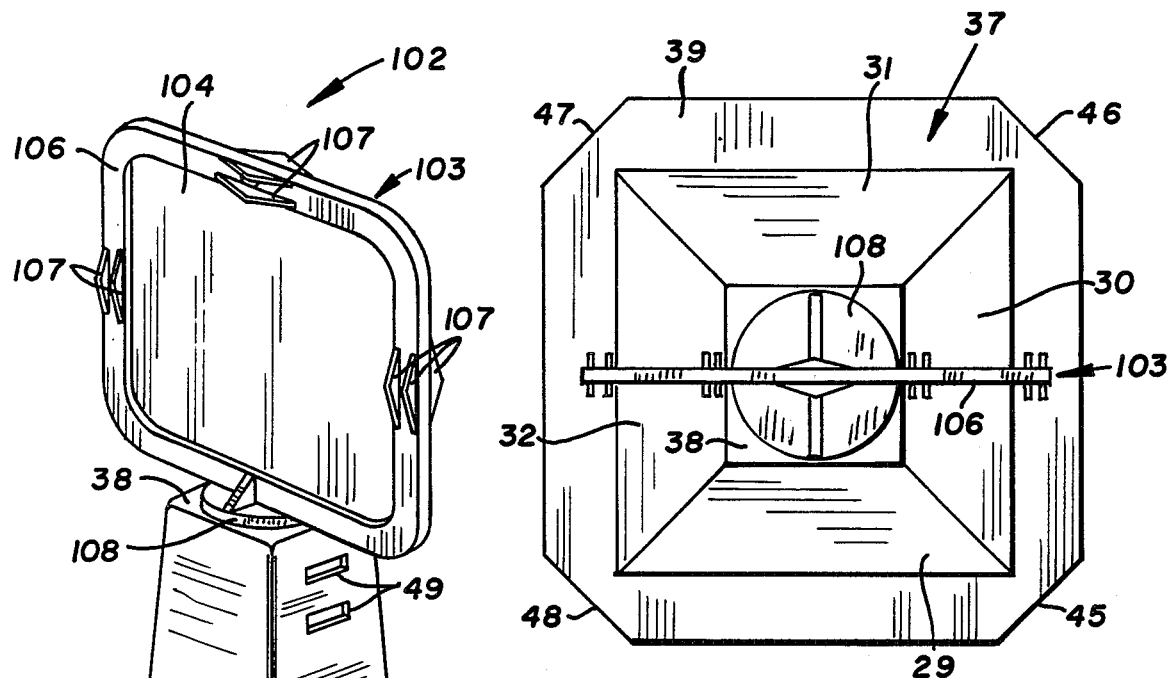
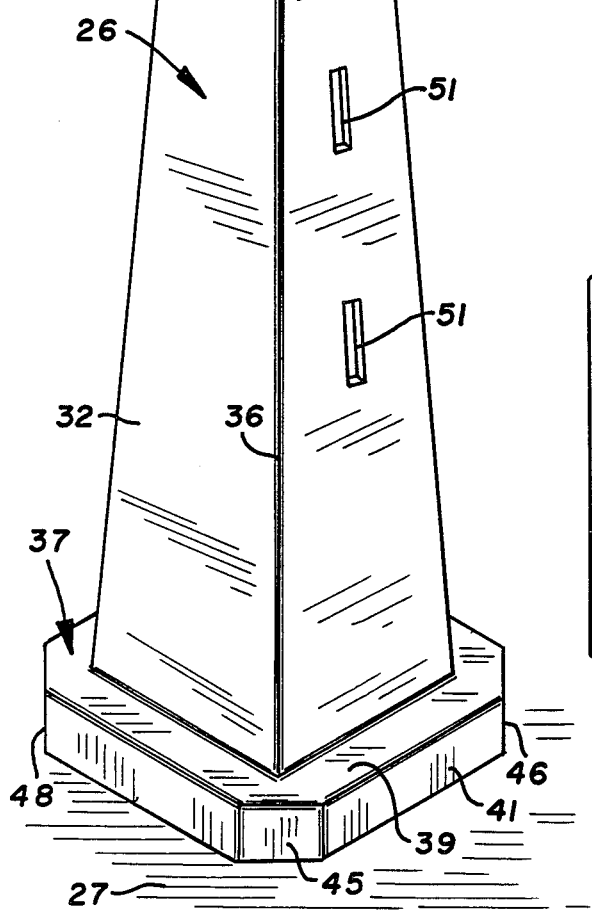
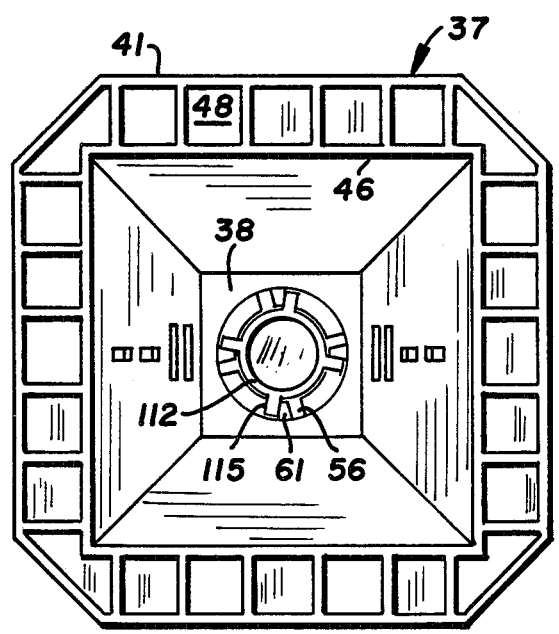
FIG. 13
FIG. 14
FIG. 15

COMMUNICATION APPARATUS

This is a continuation, of application Ser. No. 018,862 filed Feb. 24, 1987, now abandoned, application Ser. No. 018,862 is a continuation of U.S. application Ser. No. 530,970 filed Sept. 12, 1983, now abandoned.

FIELD OF INVENTION

The invention relates to portable traffic markers providing visual information to temporarily direct personnel and vehicular traffic. The communication apparatus is directed to a portable support removably accommodating an information device to provide visual information of the adjacent environment.

BACKGROUND OF INVENTION

Portable traffic cones are in use by utility and highway construction projects to provide information and divert vehicular and pedestrian traffic to a desired location. The traffic cone has a ground engaging base and an inverted hollow conical standard molded of plastic material. The standards are brightly colored to enhance their visual appearance. An example of a portable traffic marker having a conical inverted standard is shown by Brown in U.S. Pat. No. 3,809,007. The standards having tubular and tapered shapes have been proposed. Examples of markers having standards that are pyramid-shaped are shown by England in Pat. Des. No. 235,744 and Palazzolo et al. in U.S. Pat. No. 3,520,235.

SUMMARY OF INVENTION

The invention relates to a portable communication apparatus for visually displaying information. The communication apparatus has a support adapted to be located in a selected location to provide information and direction. The communication apparatus has a base secured to a generally upright support having a top wall. The information means is releasably mounted on the top wall. The information means can be a flashing light information unit or a sign information unit. The top wall and information means has cooperating means to permit the releasable attachment of an information unit on the top wall of the support.

The communication apparatus is used in a variety of applications and environments. The information units can be interchanged, providing for a maximum visibility and effectiveness. The cooperating means on the information means and top wall of the support has releasable lock-in structure which allows the information unit to be removed from the top wall of the support, without removing or loosening parts, with a minimum of time and effort. The support and information unit are a molded plastic construction which is washable, durable, strong, and corrosion and rust resistant. The plastic is preferably of a high visible color, such as orange, red, or yellow.

A specific embodiment of the communication apparatus has a support having upright side walls and a top wall forming a penta hedron. The lower ends of the side walls are attached to a base means having a plurality of pockets for accommodating weight means to stabilize the communication apparatus. The base means has an outwardly directed shoulder and an outside downwardly projected flange attached to the shoulder. A plurality of laterally spaced ribs extend from the flange and the shoulder to lower portions of the side walls to provide a plurality of open pockets located around the lower edge of the side walls. The weight means fit into the pockets and are located around the base means.

The information means is releasably mounted on the top wall. The information means has a body that extends through a circular hole in the top wall. A plurality of radial slots located in the top wall are open to the hole. The slots are located adjacent downwardly directed stop lugs on the lower side of the top wall. The body is attached to a generally flat flange held in surface engagement with the top wall. The flange is retained in engagement with the top wall, with the plurality of ears extended outwardly from the body. The ears are moved through the slots in the top wall when the body is inserted in the hole therein. The body is circumferentially twisted to move the ears into engagement with the top wall and lugs. The top wall is in frictional engagement with the flange and the ears to firmly hold the information means on the top wall.

The information means can include a generally rectangular sign board secured to the flange. The sign board has opposite surfaces for accommodating printed matter providing the desired visual and directional information. Alternatively, the information unit can include a housing supporting a flashing electric lamp. The body contains a battery providing a power supply for the intermittently operating electric lamp. This provides the communication apparatus with an intermittent or flashing light to enhance its visual signal.

DESCRIPTION OF THE DRAWING

FIG. 1 is a perspective view of the communication apparatus of the invention;

FIG. 2 is a side elevational view of the apparatus of FIG. 1;

FIG. 3 is an enlarged sectional view taken along the line 3—3 of FIG. 2;

FIG. 8 is a perspective view of the light information unit of the apparatus of FIG. 1;

FIG. 9 is an end view of the outer end of the light information unit of FIG. 8;

FIG. 10 is an end view of the inner or right end of the light information unit of FIG. 8;

FIG. 11 is a side view of the light information unit;

FIG. 12 is a sectional view taken along the line 12—12 of FIG. 11;

FIG. 13 is a perspective view of the communication apparatus equipped with a sign information unit of the invention;

FIG. 14 is a top view of FIG. 13;

FIG. 15 is a bottom view of FIG. 13;

DESCRIPTION OF PREFERRED EMBODIMENTS

Figure 4:
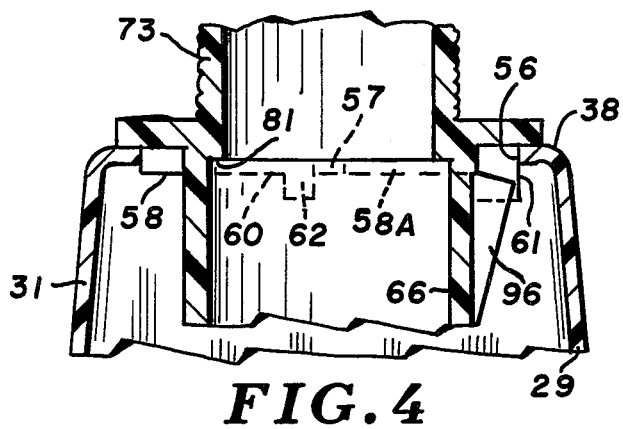
FIG. 4 is an enlarged sectional view taken along the line 4—4 of FIG. 3.

Referring to FIGS. 1 and 2, there is shown the communication apparatus of the invention indicated generally at 25 for providing direction and caution information to personnel. Apparatus 25 has an upright support or stand indicated generally at 26 supported on a sidewalk, floor, step, or similar support surface 27. A light information unit indicated generally at 28 is releasably mounted on top of stand 26. The stand 26 and information unit 28 mounted on stand 26 is a portable and highly visible communication apparatus useable to inform personnel and direct traffic flow of pedestrians and vehicles. Communication apparatus 25 is versatile in use and can be adapted to new conditions by changing the information unit 28. The information unit 28 is releasably locked onto the top of stand 26 in a manner, hereinafter described, so it can be removed and replaced with an appropriate information unit.

Stand 26 is a hollow truncated tetrahedron body having four generally flat upwardly converging side walls 29, 30, 31, and 32. Adjacent side walls are integrally joined with upright linear corners 33, 34, 35, and 36 that extend from a base 37 to a flat top wall 38. The four-sided stand can be provided with word and graphic information on each side so that it is readable by people approaching communication apparatus 25 from all directions.

Figure 6:
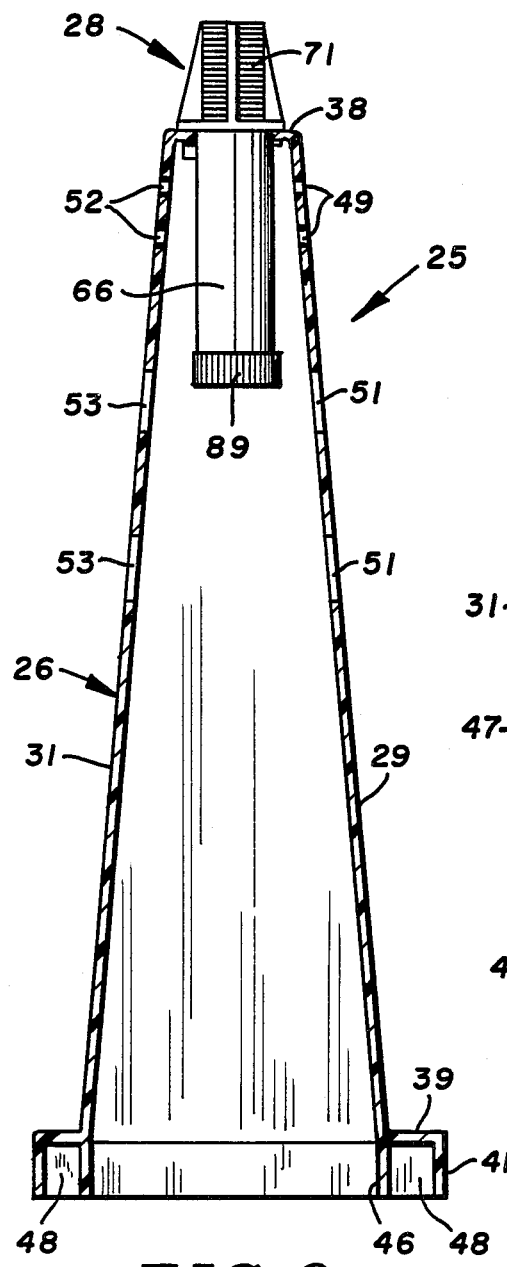
FIG. 6 is an enlarged sectional view taken along the line 6—6 of FIG. 2.
Figure 7:
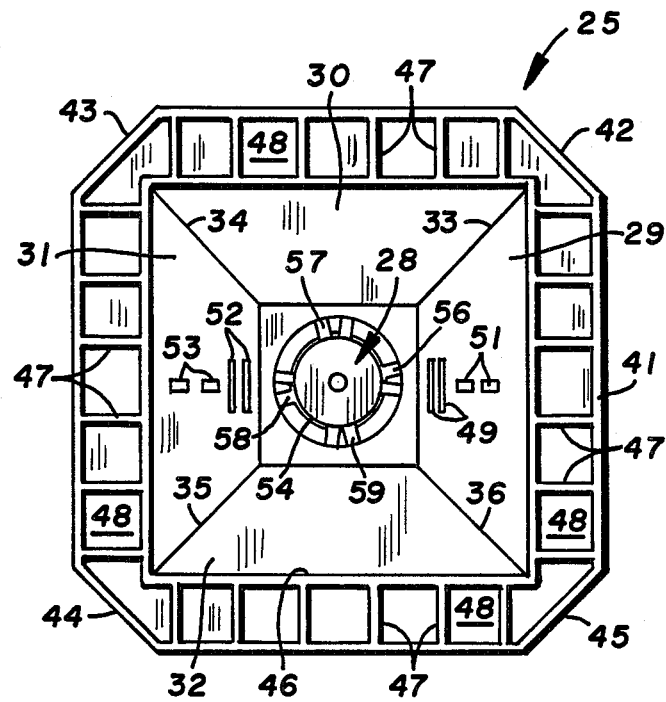
FIG. 7 is an enlarged bottom view of the apparatus viewing along the line 7—7 of FIG. 2.
Figure 16:
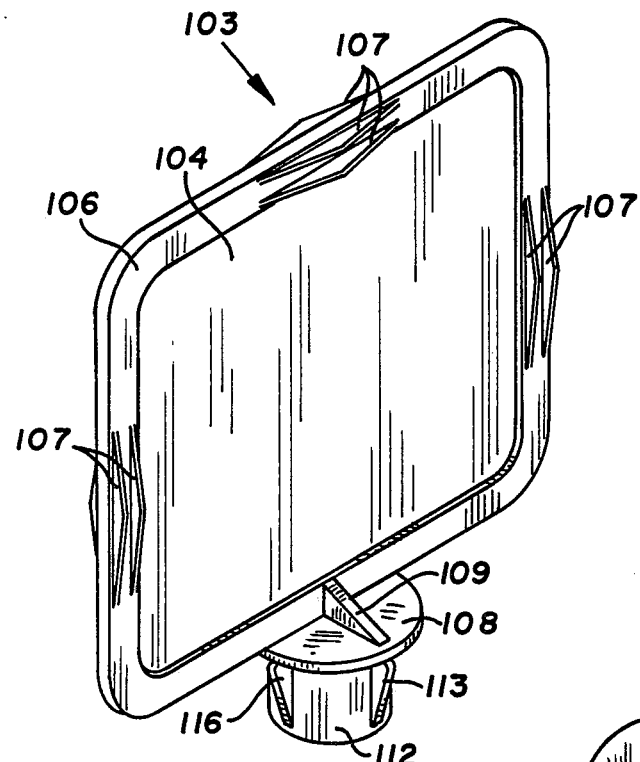
FIG. 16 is a perspective view of the sign information unit of the apparatus of FIG. 13.
Figure 17:
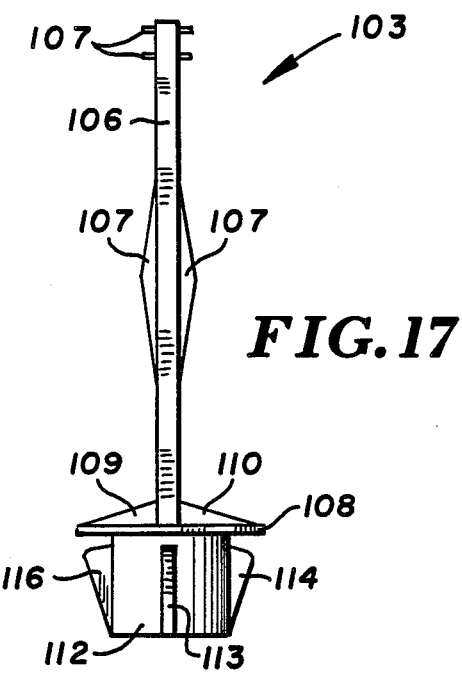
FIG. 17 is a side elevational view of FIG. 16.
Figure 20:
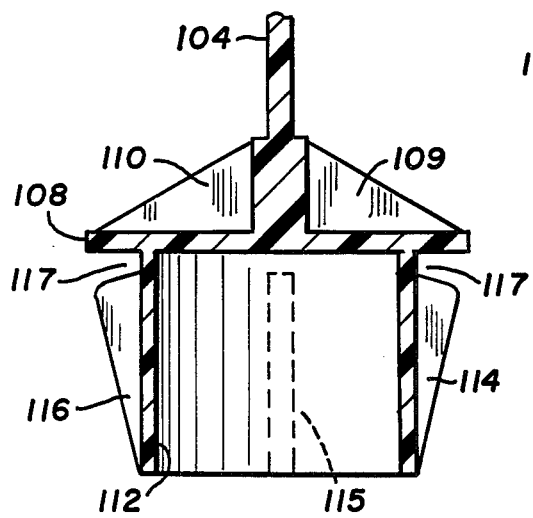
FIG. 20 is an enlarged sectional view taken along the line 20—20 of FIG. 18.
Figure 18:
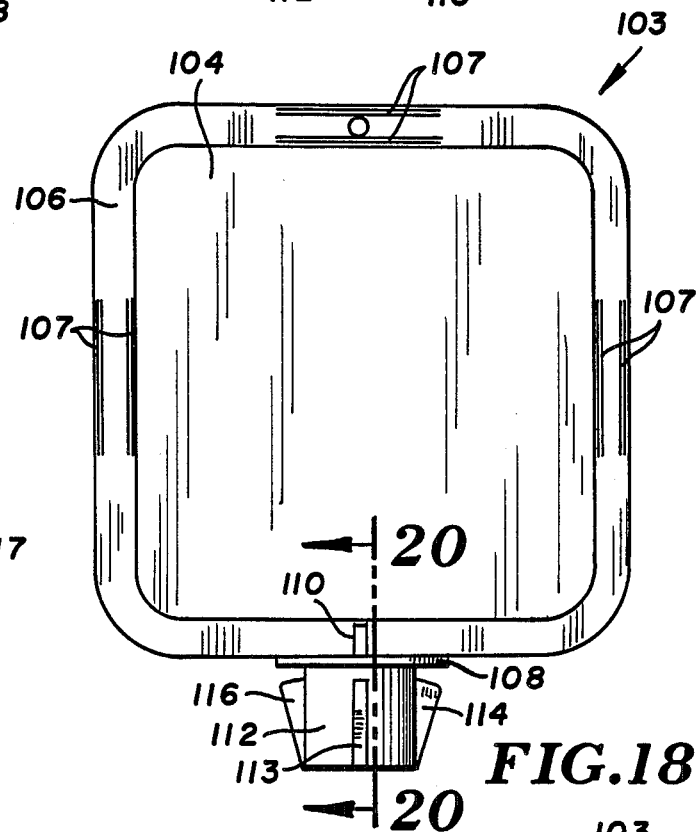
FIG. 18 is a front elevational view of FIG. 16.

Base 37 has an outwardly generally flat shoulder 39 extended around the bottom of side walls 29-33. A downwardly directed flange 41 is integral with the outer peripheral edge of shoulder 39. The lower edge of flange 41 engages floor 27. Corners 42, 43, 44, and 45 of base 37 are cut off or champhered. The center of each corner 42-45 is vertically aligned with one of the linear corners 33-36 of the truncated tetrahedron body. As shown in FIGS. 6 and 7, base 37 has a downwardly directed lip 46 that forms an extension of side walls 29-32. The lower edge of lip 46 engages support surface 27. A plurality of outwardly directed laterally spaced ribs 47 ar joined to flange 41 and lip 46 and form therewith a plurality of pockets 48. As shown in FIG. 7, pockets 48 are located in the four sides of base 37. Pockets 48 are used to accommodate weights, such as lead or metal blocks, to enhance the vertical stability of the communication apparatus. A weighted square loop (not shown) can be placed on shoulder 39 to increase the stability of stand 26.

Side walls 29-32, top wall 38, and base 37 are comprised of a one-piece structure and constructed of molded plastic, such as polyethylene. The plastic has a bright color, such as red or yellow, to enhance its visual appearance. The one-piece plastic structure is strong, durable, and rust and corrosion resistant. The entire apparatus is washable so that it can maintain a clean sharp appearance. The base 37 and hollow stand 26 allow a resting or stocking store in a minimum of space.

As shown in FIGS. 1 and 2, side wall 29 has a pair of horizontal slots 49 in the upper end thereof and vertically spaced vertical slots 51 in the intermediate or middle portion thereof. The opposite side wall 31 has identical horizontal slots 52 and vertical slots 53. Slots 49 and 52 accommodate plastic chain structures to perform elongated chain barriers. Slots 51 and 53 can accommodate the ends of boards or panels that extend between adjacent supports 26 to provide a rigid fence. Loops secured to the panels may be used to support the panels on the stands.

Figure 5:
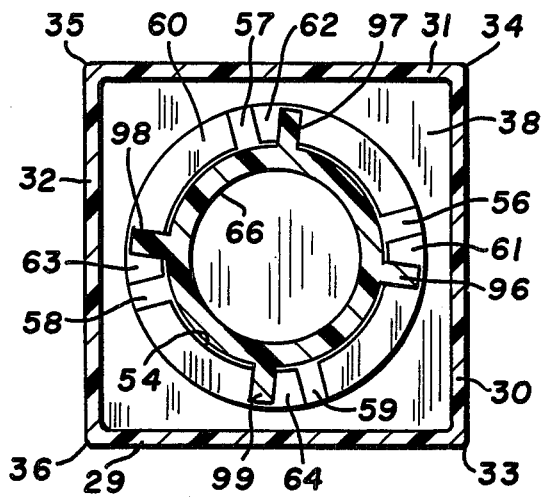
FIG. 5 is an enlarged sectional view taken along the line 5—5 of FIG. 2.

As shown in FIGS. 3 and 5, top wall 38 has a central circular opening or hole 54. A plurality of outwardly directed radial slots 56, 57, 58, and 59 are open to hole 54. Slots 56-59 are circumferentially spaced around opening 54. Adjacent slots are oriented 90 degrees from each other. Top wall 38 has downwardly directed lugs or stops 61, 62, 63, 64 located adjacent one side of each slot 56-59, respectively. Lugs 61-64 extend downwardly from the inside surface of top wall 38. The inside surface of top wall 38 surrounding hole 54 is enlarged to provide arcuate beads or shoulders 58A and 60.

Light information unit 28 is shown in detail in FIGS. 8-12. Unit 28 has a linear casing or tubular body 66 having a chamber 67 to accommodate a pair of dry cells or batteries 68 and 69 having the usual electrical terminals. A cup-shaped cover or housing having a cylindrical side wall 71 and an end wall 74 surrounds a chamber 72. Wall 71 is joined to a circular outwardly directed support flange 73. Walls 71 and 74 are transparent plastic. Preferably, the walls 71 and 74 are red plastic. A plurality of upwardly directed gusset flanges 76, 77, 78, and 79 are joined to flange 73 and the outside of wall 71.

As shown in FIG. 12, circular flange 73 is integral with an end of casing 66 and side wall 71. Flange 73 extends annularly and inwardly to form an annular inside shoulder or stop 81 for a circular plate or support disc 82. Disc 82 has a central hole accommodating a light bulb or lamp 83 located in chamber 72. Lamp 83 has a threaded base 84 extended through a central hole in disc 82 and threaded through a hole 86 in an electrical conductor strip 87. Conductor strip 87 extends longitudinally in chamber 67 around batteries 68 and 69 and terminates in an end 88 engageable with the negative end or terminal of battery 69. The lamp base 84 is engaged with the central terminal of battery 68, thereby completing the electrical circuit between the batteries 68 and 69 and light bulb 83. Lamp 83 has an electrical light emitting element that sequentially turns on and off to provide a flashing light. Other types of light bulbs can be supported on disc 82. The lower end of casing 66 accommodates a cap 89. Cap 89 has a central inwardly directed boss 91 that engages conductor end 88 and holds end 88 in engagement with the base of battery 69. Cap 89 has an annular outside flange 92 having internal threads 93 that cooperate with external threads 94 on casing 66. Cap 89 can be removed from casing 66 by circumferentially rotating the cap to unthread it from casing 66. Batteries 68 and 69 can be removed and replaced with fully charged batteries. Cap 89 can be turned back to release the force on conductor end 88 and allow the batteries 68 and 69 to move away from lamp base 84, thereby opening the electrical circuit to lamp 83.

As shown in FIGS. 8, 10, 11, and 12, a plurality of ears 96, 97, and 98, 99 project outwardly from casing 66 adjacent flange 73. Ears 96-99 are aligned with ribs 76-79, respectively. Adjacent ears are circumferentially oriented relative to each other with the same circumferential orientation as the radial slots 56, 59 in top wall 38. Referring to FIG. 12, ear 96 has an upwardly and outwardly inclined edge 96A and an upper inwardly directed edge 96B. Each ear 97, 98, and 99 has similar edges indicated by the same reference numerals having the suffixes A and B. The edges 96B-99B are longitudinally spaced from flange 73 to provide gaps or throats 101. The throats 101 have a thickness that is substantially the same as the thickness of the enlarged shoulders 60 of top wall 38. Portions of the shoulder 60 extend between adjacent slots 76–79 and friction fit into throats 101 to releasably mount light information unit 28 on top wall 38. The casing 66, walls 71 and 74, flanges 76–79, and ears 96–99 are a one-piece plastic unit. Other materials can be used in the construction of information unit 28.

In use, cap 89 is turned onto the casing to effect an electrical connection between battery 68 and base 84 and light bulb 83. This completes the electrical circuit to light bulb 83, thereby causing the light bulb to intermittently turn on and off or flash. Casing 66 and cap 89 are moved longitudinally downward through hole 54 in top wall 38. Ears 96–99 are aligned with slots 56–59. When flange 73 engages top wall 38, the entire light information unit 28 is rotated until ears 96–99 engage lugs 61–64. As shown in FIG. 5, ears 96–99 are in engagement with the sides of lugs 61–69.

Light information unit 28 is removed from the top wall 38 by rotating the unit in an opposite direction to align ears 96–99 with slots 56–59. This releases the holding action of ears 96–99 on shoulder 60 of top wall 38 and allows the entire light information unit 28 to be vertically removed from support 26.

Referring to FIGS. 13–15, there is shown a modification of the communication apparatus indicated generally at 102 for providing visual information to personnel. The communication apparatus 102 has the body or support 26, as shown and described with regard to FIGS. 1–7. A sign information unit indicated generally at 103 is releasably mounted on the top wall 38 of support 26. Sign information unit 103 is adapted to support printed matter in the form of decals that have vivid illustrations and explanatory copy. The printed decals contain pictorial information and symbols, as well as words, such as DANGER FLAMMABLES, SLIPPERY, OUT OF SERVICE, NO SMOKING, NO ENTRY RESTROOM CLOSED, NO ENTRY CONSTRUCTION, MOVING VEHICLES, ELECTRICAL HAZARD, WATCH YOUR STEP, WET PAINT, HARD HAT AREA, SAFETY GLASSES REQUIRED, and the like. Other types of information can be placed on the sign information unit 103.

Sign information unit 103 has a flat member or board 104 surrounded by an outer peripheral frame 106. Frame 106 has a plurality of parallel ribs 107 in the center sections of the sides and tops to strengthen the frame. A circular member or flange 108 is integral with the central section of the bottom of frame 106. Gusset members or ribs 109 and 110 join flange 108 to the sides of frame 106.

Figure 19:
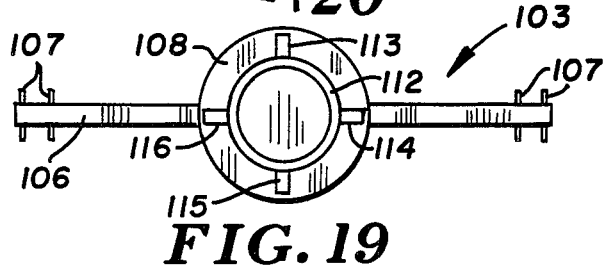
FIG. 19 is a bottom view of FIG. 18.

A tubular member or cylindrical body 112 projects downwardly from the bottom of flange 107. Body 112 has a plurality of outwardly directed ears 113, 114, 115, and 116. The upper edges of ears 113–116 are spaced from the flange 108 to form throats 117. The throats 117 have approximately the width of the thickness of the shoulder 60 on the top wall 38, whereby the top wall 38 has a friction fit between ears 113–116 and flange 108. Ears 113–116 are circumferentially oriented from each other with the same circumferential orientation as slots 56–59 in top wall 38. This orientation is the 90 degree relationship between adjacent ears, as shown in FIG. 19. The entire sign information unit 103 is preferably made of plastic. Other types of materials can be used in the construction of the sign information unit 103.

In use, sign information unit 103 is attached to top wall 38 by placing the tubular member 112 in the hole 54 in top wall 38. The lower surface of flange 108 rests on top wall 38. The ears 113–116 are aligned with slots 56–59. The entire sign information unit 103 is turned about an upright axis approximately 45 degrees or until ears 113–116 engage lugs 61–64, depending from top wall 38. As shown in FIG. 14, when sign information unit 103 is mounted on top wall 38, the flat plane of the board 104 is located in general parallel alignment with side walls 30 and 32. This allows information on the side walls 30 and 32 to be coordinated with the printed symbol and word information carried by the board 104.

Sign information unit 103 is removed from support 26 by rotating unit 103 in a direction to move ears 113–116 away from lugs 61–64 and aligning ears 113–116 with slots 56–59. The entire sign information unit 103 is then withdrawn vertically from top wall 38. A second sign information unit containing appropriate printed information can be mounted on top wall 38. Alternatively, light information unit 28 can be mounted on top wall 38.

Light unit 28 and sign unit 103 can be replaced with a circular container unit having a flange, tubular member, and ears adapted to be mounted on the top wall 38 of stand 26, as described with respect to light unit 28. The container unit can be a box, a circular disc-shaped member, or ash tray.

While there has been shown and described the preferred embodiments of the communication apparatus of the invention, it is understood that changes in the materials, size, colors, and printed matter, graphic and design information may be made by those skilled in the art without departing from the invention. The invention is defined in the following claims.

The embodiments in which an exclusive property or privilege is claimed are defined as follows:

1. A communication apparatus comprising: a stand adapted to be located on a support, said stand having a base, upright side walls secured to the base, and a top wall secured to the side walls, said top wall having a generally horizontal flat top surface and a bottom surface having an annular shoulder, information means to provide visual information, said top wall and information means having cooperating means mounting the information means on the top wall and allowing the information means to be removed from the top wall, said cooperating means comprising a circular hole and at least one outwardly directed slot open to the hole in said top wall, said top wall having a circular edge forming said hole, and said information means having an outwardly directed annlar flange having a flat bottom surface located in surface engagement with the top surface of the top wall, a cylindrical body mounted on the flange and projected therefrom, said flange having a top surface, a plurality of upwardly directed ribs joined to the top surface of the flange and the body and at least one ear joined to and projected outwardly from said body, said body having an outside cylindrical surface located closely adjacent the circular edge forming said hole whereby the body can be rotated relative to said top wall, said ear spaced below said flange, said body extended through said hole, and said ear extended through said slot and engageable with said annular shoulder of the bottom surface of the top wall on rotation of said body to retain the bottom surface of the flange in flat surface engagement with the top surface of the top wall thereby mounting the information means on said top wall, said base has an outwardly directed shoulder, said shoulder having an outer peripheral edge and a bottom surface, a downwardly projected base flange joined to said peripheral edge, and ribs joined to the bottom surface of the shoulder and base flange providing pockets for accommodating weight means, said side walls having lower portions located inwardly of said base flange with said pockets located between said lower portions and said base flange.

2. The apparatus of claim 1 wherein: said upright side walls of said support are arranged in a non-circular pattern.

3. The apparatus of claim 2 wherein: said side walls comprise four generally flat walls forming a tetrahedron.

4. The apparatus of claim 1 wherein: said shoulder and flange have a generally square shape, said side walls comprising four generally flat side walls forming a tetrahedron.

5. The apparatus of claim 1 wherein: said information means includes a sign member having opposite sides for accommodating printed information.

6. The apparatus of claim 1 wherein; said information means includes an electric lamp, and an electric power supply connected to said lamp to provide the lamp with electric power thereby generating visible light, said electric power supply being located within said body.

7. The apparatus of claim 6 wherein: said electric lamp includes means to intermittently operate the lamp when connected to the power supply thereby generating a flashing light.

8. The apparatus of claim 1 wherein: said information means includes a housing having a chamber mounted on the flange opposite the body, a support member having a hole mounted on the flange, a lamp mounted on the support member, said lamp having a light bulb located in said chamber and a base extended through said hole in the support member, and an electrical conductor located in the body, battery means having opposite terminal located within said body, said base engageable with one terminal of said battery means, said electrical conductor being engageable with the other terminal of said battery means, and cap means attached to said body to hold the base and electrical conductors in engagement with their respective terminals.

9. The apparatus of claim 8 wherein: said cap means is threaded onto said body, said cap means being rotatable to a first position to hold the base and electrical conductors in enagement to their respective terminals and rotatable to a second position to disengage the base from said one terminal thereby disconnecting the lamp from said battery means.

10. A communication apparatus for visually displaying information comprising: a support having a top wall, said top wall having a flat top surface and bottom surface having an annular shoulder, information means mounted on said top wall, said top wall and information means having cooperating means mounting the information means on said top wall, said cooperating means including a circular hole and a plurality of outwardly directed equal laterally spaced radial slots open to the hole in said top wall and a plurality of downwardly directed lugs joined to the bottom surface of the top wall adjacent each slot, said top wall having a circular edge forming said hole, and an outwardly directed flange having a flat bottom surface and top surface, a cylindrical body on said information means, a plurality of upwardly directed rib members joined to the body and the top surface of the annular flange, and a plurality of ears extended outwardly from said body and spaced downwardly from said flange, said ears having the same circumferential orientation as the slots, said body having an outside cylindrical surface located closely adjacent the circular edge forming said hole whereby the body can be rotated relative to said top wall, said body extended through said hole and said ears extended through said slots and engageable on rotation of the body with the annular shoulder on the bottom surface of the top wall and lugs to retain the bottom surface of the annular flange in flat surface engagement with the top surface of the top wall thereby holding the information means on said top wall.

11. The apparatus of claim 10 wherein: said support has side walls arranged in a non-circular pattern.

12. The apparatus of claim 10 wherein: the side walls comprise four generally flat walls forming a tetrahedron.

13. The apparatus of claim 10 wherein: said support includes a base, side walls extended upwardly from the base, said top wall being secured to said side walls, said base having a a plurality of pockets to accommodate weight means.

14. The apparatus of claim 13 wherein: said base includes an outwardly directed shoulder, a downwardly projected base flange, and ribs joined to the shoulder and base flange providing pockets for accommodating weight means, said side walls having lower portions located inwardly of said base flange with said pockets located between said lower portions and said base flange.

15. The apparatus of claim 14 wherein: said shoulder and base flange have a generally square shape, said side walls comprising four generally flat side walls forming a tetrahedron.

16. The apparatus of claim 10 wherein: said information means includes a sign member having opposite sides for accommodating printed information.

17. The apparatus of claim 10 wherein: said information means includes an electric lamp and an electric power supply connected to said lamp to provide the lamp with electric power thereby generating visible light.

18. The apparatus of claim 17 wherein: said electric lamp includes means to intermittently operate the lamp when connected to the power supply thereby generating a flashing light.

19. The apparatus of claim 10 wherein: said information means includes a housing having a chamber mounted on the flange, a support member having a hole mounted on the flange, a lamp mounted on the support member, said lamp having a light bulb located in the chamber and a base extended through said hole in the support member, an electrical conductor secured to said base, battery means having opposite terminals located in said body, said base being engageable with one terminal, said electrical conductor being engageable with the other terminal, and cap means attached to said body to hold the base and electrical conductors in engagement with their respective terminals.

20. The apparatus of claim 19 wherein: said cap means is threaded onto said body, said cap means being rotatable to a first position to hold the base and electrical conductors in engagement with their respective terminals, and rotatable to a second position to disengage the base from said one terminal, thereby disconnecting the lamp from said battery means.

* * * * *